(12) United States Patent
Shikolski et al.

(10) Patent No.: US 10,195,793 B2
(45) Date of Patent: Feb. 5, 2019

(54) WATER SOLUBLE SUPPORT FOR JOINING PIPES AND METHODS OF MANUFACTURE AND USE THEREOF

(71) Applicant: IMI TAMI INSTITUTE FOR RESEARCH AND DEVELOPMENT LTD., Haifa Bay (IL)

(72) Inventors: Gideon Shikolski, Kiriat Motzkin (IL); Eyal Barnea, Nesher (IL); Ezra Hanuka, Nesher (IL); Dorit Canfi, Zichron Ya'Akov (IL)

(73) Assignee: IMI TAMI INSTITUTE FOR RESEARCH AND Development LTD., Haifa Bay (IL)

( * ) Notice: Subject to any disclaimer, the term of this patent is extended or adjusted under 35 U.S.C. 154(b) by 309 days.

(21) Appl. No.: 14/907,834

(22) PCT Filed: Jul. 29, 2014

(86) PCT No.: PCT/IL2014/050687
§ 371 (c)(1),
(2) Date: Jan. 27, 2016

(87) PCT Pub. No.: WO2015/015492
PCT Pub. Date: Feb. 5, 2015

(65) Prior Publication Data
US 2016/0159005 A1    Jun. 9, 2016

Related U.S. Application Data

(60) Provisional application No. 61/860,933, filed on Aug. 1, 2013.

(51) Int. Cl.
| | |
|---|---|
| B22C 9/10 | (2006.01) |
| B29C 33/52 | (2006.01) |
| B29C 65/02 | (2006.01) |
| F16L 47/02 | (2006.01) |
| B29C 65/00 | (2006.01) |
| B23K 9/035 | (2006.01) |
| B23K 37/06 | (2006.01) |
| B23K 31/02 | (2006.01) |
| B29L 23/00 | (2006.01) |
| B23K 101/06 | (2006.01) |

(52) U.S. Cl.
CPC ............. B29C 66/63 (2013.01); B22C 9/105 (2013.01); B23K 9/035 (2013.01); B23K 31/02 (2013.01); B23K 37/06 (2013.01); B29C 33/52 (2013.01); B29C 65/02 (2013.01); B29C 66/1142 (2013.01); B29C 66/3242 (2013.01); B29C 66/5221 (2013.01); B29C 66/73921 (2013.01); F16L 47/02 (2013.01); B23K 2101/06 (2018.08); B29K 2995/0062 (2013.01); B29L 2023/22 (2013.01)

(58) Field of Classification Search
CPC ........ B22C 9/105; B23K 9/035; B23K 31/02; B23K 37/06; B23K 2201/04; B23K 2201/06; B29C 33/52; B29C 65/02; B29C 65/18; B29C 65/20; B29C 66/1142; B29C 66/3242; B29C 66/5221; B29C 66/63; B29C 66/71; B29C 66/73921; B29K 2023/06; B29K 2995/0062; B29L 2023/22; F16L 47/02
See application file for complete search history.

(56) References Cited

U.S. PATENT DOCUMENTS

| | | | |
|---|---|---|---|
| 3,356,129 A * | 12/1967 | Anderko | ................. B22C 9/105 164/138 |
| 3,407,864 A | 10/1968 | Anderko et al. | |
| 4,228,941 A | 10/1980 | Persson | |
| 2009/0289392 A1 | 11/2009 | Grozinger | |

FOREIGN PATENT DOCUMENTS

| | | | |
|---|---|---|---|
| CN | 101708566 A | 5/2010 | |
| EP | 0304572 A2 * | 3/1989 | ........... B29C 33/448 |
| FR | 2077555 A1 * | 10/1971 | |
| GB | 709824 A | 6/1954 | |
| GB | 858517 A | 1/1961 | |
| GB | 1179241 A * | 1/1970 | ............ B22C 9/105 |
| WO | 2001/002112 A1 | 1/2001 | |
| WO | 2015/015492 A1 | 2/2015 | |

OTHER PUBLICATIONS

International Search Report of PCT/IL2014/050687, dated Dec. 13, 2014.
Written Opinion of PCT/IL2014/050687, dated Dec. 13, 2014.
International Preliminary Report on Patentability of PCT/IL2014/050687, dated Dec. 20, 2015.

* cited by examiner

*Primary Examiner* — Michael A Tolin

(57) ABSTRACT

A water-soluble insert for use in joining pipes, made of a material comprising a salt selected from the group consisting of KCl, Na Cl, and mixtures thereof; and MgO. Upon addition of a small amount of water to the material, the MgO reacts with hygroscopic impurities in the chloride salt to provide a material with superior properties. The insert is cast from the material, in general by being placed on a form and compressed. Also disclosed is the use of the insert in joining the ends of two pipes, especially pipes made from thermoplastic. The insert is placed in the matching pipe ends, which are then welded. After the join is complete, water is flowed through the pipe, dissolving the insert.

18 Claims, No Drawings

WATER SOLUBLE SUPPORT FOR JOINING PIPES AND METHODS OF MANUFACTURE AND USE THEREOF

REFERENCE TO RELATED APPLICATION

This application claims priority from U.S. Provisional Pat. Appl. No. 61/860,933, filed 1 Aug. 2013.

FIELD OF THE INVENTION

This invention relates to supports used in the joining of pipes such as plastic pipes. In particular, it relates to inserts made of water-soluble heat-resistant material that can be washed away after the joint is complete.

BACKGROUND OF THE INVENTION

Welding of pipes made of thermoplastic materials generally leads to thickening of the walls of the pipes in the vicinity of the weld, and produces a lip or internal bead at the point of the join. This thickening of the wall or lip causes a reduction in the internal diameter of the pipe at the point of the weld, constricting the flow of fluid through the pipe. The internal lip or bead also creates a point where precipitates such as like lime scale or other insoluble materials can accumulate. A similar problem is encountered in cases in which the pipes are supported by an insert that stiffens the pipes and holds them in place. Typical inserts are made of plastic and frequently include a tab or flange against which the pipe ends are placed. These types of inserts remain in place after the weld is complete, thus constricting the pipe at the point of the join.

There has been some effort to produce inserts made of water-soluble materials. Use of such an insert would have the advantage that flowing water through the pipe after welding will wash away the insert, leaving an unconstricted join.

British Pat. No. 709824 discloses a method of butt-welding thermoplastic pipes that comprises inserting into the interior of the pipes at the point of the join a non-toxic material that dissolves without leaving any sediment. The materials disclosed include a soluble carbohydrate such as sugar or starch to which a soluble binder such as albumin or glucose may be added, or a natural earth such as Fullers' earth with a soluble binder. The linings are produced by extrusion or molding.

British Pat. No. 858517 discloses a lining sleeve for use in welding together abutting ends of tubular metal members. Two water-soluble compositions for manufacture of the sleeve are disclosed. One comprises of a water-soluble material made of water-free 20-60% NaCl, 60-20% $MgCl_2$, and 20% $Na_2SiO_3$, and the other comprises 30% $KAl(SO_4)_2 \cdot 12H_2O$, 30% $H_3BO_4$, 10% $CaCO_3$, and 30% $Na_2SiO_3$.

U.S. Pat. No. 4,228,941 discloses a method for joining by explosive welding a smaller inner metal pipe to a larger outer metal pipe that surrounds it. The method comprises inserting a rigid contact body made of a soluble composition comprising $NaNO_2$, $NaNO_3$, and $KNO_3$.

The compositions known in the art for forming water-soluble inserts are not ideal. For example, they tend to comprise organic materials or environmentally unfriendly salts. In addition, many of the compositions known in the art comprise hygroscopic materials. Compositions that comprise a large concentration of a hygroscopic salt such as $MgCl_2$ tend to absorb moisture, to agglomerate or to crumble, and inserts formed from such compositions tend to be weak and fragile. An insert for use in the joining of two pipes in which the insert prevents the introduction of welding material into the pipes and is made of an environmentally-friendly non-hygroscopic inorganic material that has the desired physical properties of being castable into an insert, sufficient heat resistance to be usable in welding, and high water solubility thus remains a long-felt but as yet unmet need.

SUMMARY OF THE INVENTION

The insert herein disclosed is designed to meet this need. Small amounts of MgO and water are added to a salt containing hygroscopic impurities such as $MgCl_2$ and $CaCl_2$. The MgO reacts with the impurities, leaving behind a material that is sufficiently strong and resistant to crumbling but yet sufficiently water-soluble to be useful in the manufacture of an insert for use in joining pipes.

It is therefore an object of the present invention to disclose a water-soluble insert for use in joining pipes, said water-soluble insert made of a material comprising (a) a salt selected from the group consisting of KCl, NaCl, and mixtures thereof and (b) MgO. In some preferred embodiments of the invention, said water-soluble insert consists of (a) a salt selected from the group consisting of KCl, NaCl, and any combination thereof, (b) MgO, and (c) optionally, a solubility enhancer.

In some preferred embodiments of the water-soluble insert, said MgO comprises particles of diameters between 2 and 4 microns. In some preferred embodiments of the water-soluble insert, said salt comprises commercial-grade KCl. In some preferred embodiments of the water-soluble insert, said KCl is in the form of particles with an average size of about 0.5 mm. In some embodiments of the water-soluble insert, the weight ratio KCl:MgO is 96.5:3.5 and 97.5:2.5 inclusive.

It is a further object of this invention to disclose a water-soluble insert as defined in any of the above, wherein the amount of MgO is between 2.5 and 3.5 times by weight of that of impurities in said salt.

It is a further object of this invention to disclose a water-soluble insert as defined in any of the above, wherein said salt comprises NaCl. In some preferred embodiments of the water-soluble insert, it comprises 0.2% by weight $MgCl_2$, 0.7% MgO, and the remainder NaCl.

It is a further object of this invention to disclose a water-soluble insert as defined in any of the above, further comprising a solubility enhancer. In some preferred embodiments of the invention, the solubility enhancer is selected from the group consisting of (a) a mixture of $NaHCO_3$ and citric acid and (b) a mixture of $Na_2CO_3$ and citric acid.

It is a further object of this invention to disclose a water-soluble insert as defined in any of the above, wherein said water-soluble insert is in the form of a tube.

It is a further object of this invention to disclose a water-soluble insert as defined in any of the above, wherein said water-soluble insert is in the form of a solid cylinder.

It is a further object of this invention to disclose a method of preparing a water-soluble insert for use in joining pipes, comprising: mixing a salt selected from the group consisting of KCl, NaCl, and mixtures thereof with MgO; adding water in a quantity sufficient such that reaction between said MgO and impurities in said salt can take place; drying the product of said step of adding water; and, casting said product of said step of drying, thereby forming said insert.

It is a further object of this invention to disclose a method of preparing a water-soluble insert for use in joining pipes, comprising: adding water to a salt selected from the group consisting of KCl, NaCl, and mixtures thereof; adding MgO to the product of the previous step; drying the product of said step of adding MgO; placing the product of said step of drying in a form; and, applying pressure to said form until a water-soluble insert is formed. In some embodiments, the method further comprises a step of adding $MgCl_2$ to said salt. In some embodiments, said step of adding $MgCl_2$ comprises adding 0.2% by weight $MgCl_2$ to said salt.

It is a further object of this invention to disclose the method as defined in any of the above, wherein said step of mixing comprises mixing MgO in an amount equal to between 2.5 and 3.5 times by weight that of impurities in said salt.

It is a further object of this invention to disclose the method as defined in any of the above, wherein said step of mixing comprises mixing commercial-grade KCl with MgO in a KCl:MgO ratio of between 96.5:3.5 and 97.5:2.5 by weight.

It is a further object of this invention to disclose the method as defined in any of the above, wherein said step of mixing comprises mixing NaCl, $MgCl_2$, and MgO in a weight ratio of 99.1:0.2:0.7.

It is a further object of this invention to disclose the method as defined in any of the above, wherein said step of mixing comprises mixing until a homogeneous mixture is obtained.

It is a further object of this invention to disclose the method as defined in any of the above, wherein said step of adding water comprises adding ≤2% water by weight to the product of said step of mixing.

It is a further object of this invention to disclose the method as defined in any of the above, wherein said step of drying comprises drying at a temperature not exceeding 120° C.

It is a further object of this invention to disclose the method as defined in any of the above, wherein said step of drying comprises drying in a drying oven.

It is a further object of this invention to disclose the method as defined in any of the above, additionally comprising: breaking up a mass obtained after said step of drying; and, sieving through a 1 mm sieve.

It is a further object of this invention to disclose the method as defined in any of the above, wherein said step of drying comprises drying in a rotating drum oven.

In some preferred embodiments of the method, said step of casting comprises placing the product of said step of drying in a form; and, applying pressure to said form until a water-soluble insert is formed. In some preferred embodiments of the method, said step of applying pressure comprises applying pressure of between 200 and 1000 kg/cm².

It is a further object of this invention to disclose a water-soluble insert as defined in any of the above produced by the method as defined in any of the above.

It is a further object of this invention to disclose the use of the water-soluble insert as defined in any of the above in joining of the ends of two pipes.

It is a further object of this invention to disclose a method of joining the ends of two pipes, comprising: inserting into the opposed ends of said pipes an insert as defined in any of the above; and, joining said two pipes, thereby producing a joined pipe. In some preferred embodiments of the method, it additionally comprises flowing water through said joined pipe until said insert has dissolved. In some preferred embodiments of the method, said step of joining comprises butt-welding said two pipes. In some preferred embodiments of the method, said two pipes are made of a thermoplastic material.

DETAILED DESCRIPTION OF THE PREFERRED EMBODIMENTS

In the following description, various aspects of the invention will be described. For the purposes of explanation, specific details are set forth in order to provide a thorough understanding of the invention. It will be apparent to one skilled in the art that there are other embodiments of the invention that differ in details without affecting the essential nature thereof. Therefore the invention is not limited by that which is illustrated in the FIGURE and described in the specification, but only as indicated in the accompanying claims, with the proper scope determined only by the broadest interpretation of said claims.

The term "about," when applied to numerical quantities, refers to a range of ±20% relative to the nominal value.

Unless otherwise stated, compositions described herein are given in amounts by weight.

Commercial-grade KCl and NaCl typically contain small amounts of $MCl_2$ (M=Mg, Ca, or a combination thereof) impurities. These $MCl_2$ salts are significantly more hygroscopic than the alkali metal chloride, which, as described above, leads to a final product with a tendency to agglomerate and then to crumble, making it unsuitable for use in an insert for supporting the ends of pipes (e.g. thermoplastic pipes) during welding. The inventors have discovered that addition of small amounts of MgO yields a material that is far more suitable for use in an insert for supporting pipe ends during their joining than KCl or NaCl alone. The lower tendency of KCl/MgO mixtures to absorb water relative to commercial-grade KCl is known in the art; see, for example, U.S. Pat. No. 6,379,414, which is hereby incorporated in its entirety by reference.

In a typical embodiment, the insert is made from a material produced from commercial-grade KCl, typically in the form of particles of average size of approximately 0.5 mm. MgO, typically in the form of 2-4 micron particles, is added to the KCl. In some embodiments, between 2.5% and 3.5% MgO by weight relative to the KCl is added.

In some preferred embodiments, MgO is added in amount of about 3 times by weight relative to the amount of $MCl_2$. For example, when commercial-grade KCl containing about 0.2% $MgCl_2/CaCl_2$ is used, in preferred embodiments, about 0.7% MgO is added. The ratio of MgO to $MCl_2$ can be varied from the ratios used in these preferred embodiments without significantly affecting the properties of the final product. Thus, the inventors have found that lower ratios (e.g. ~1.7) can be used. The use of higher MgO:$MCl_2$ ratios is contemplated by the inventors as being within the scope of the invention, although in practice, high ratios are used only in exceptional circumstances due to the higher cost of MgO relative to the other components of the mixture and the increased amount of insolubles produced when higher ratios of MgO are used.

In preferred embodiments, the MgO and KCl are then mixed until a homogeneous mixture is obtained, typically for 5-15 minutes. Enough water is added (typically 2%) to the KCl/MgO mixture to enable the MgO to react with the impurities in the KCl.

In some embodiments of the insert, it is made from a material produced as above except that commercial-grade NaCl is used instead of KCl.

In some embodiments of the insert, it is made from a material produced from NaCl. A small amount (in typical embodiments, about 0.2% by weight) of $MgCl_2$ is added to NaCl powder. After the NaCl and $MgCl_2$ are mixed, a small amount (typically about 2%) of water is mixed. MgO (typically in an amount of about 3 times by weight of that of the $MgCl_2$) is added to the wet mixture, and the material then produced as described above. A solution of $MgCl_2$ can be used in place of the solid.

The wet mixture is then dried. The drying can be performed by any method known in the art. In some preferred embodiments, the mixture is dried in a drying oven for about 2 hours, during which the temperature in the oven rises from room temperature to 120° C. When a static drying oven is used, it is usually necessary to break up the mass removed from the oven into pieces, which in preferred embodiments are then sieved through a 1 mm sieve to produce a powder. When a rotating drum oven is used, the dry product is normally obtained in the form of a powder, and there is no necessity for further breaking up or sieving.

In some embodiments of the invention, a solubility enhancer such as a mixture of $Na_2CO_3$ and citric acid or a mixture of $NaHCO_3$ and citric acid is added to the material prior to the casting of the insert in order to increase the rate of dissolution of the insert.

It is within the scope of the invention to disclose an insert made from the material produced as described above. The material is cast into the desired shape; non-limiting shapes include solid cylinders and tubes. In preferred embodiments of the invention, the powdered material is placed in a form of the desired shape and pressed into the desired shape. In typical embodiments, the material is exposed to a pressure of between 200 and 1000 $kg/cm^2$ until the insert of the desired shape is obtained.

The inserts made in this fashion dissolve quite rapidly in flowing water, typically within minutes, complete dissolution taking up to approximately an hour.

It is also within the scope of the invention to disclose the use of the inserts described above in the joining of pipes.

It is also within the scope of the invention to disclose a method for joining pipe ends. The insert described above, with an outer diameter matching the inner diameter of the pipe ends, is placed within the ends of the pipes to be joined. The pipes are then joined by any method known in the art such as butt welding. The insert is then rinsed away under a flow of water through the joined pipes, leaving behind a single joined pipe without any constriction in its inner diameter and inside which none of the welding material remains. This method is particularly useful for joining pipes made of thermoplastic material. The insert is sufficiently stiff to support the material and sufficiently heat-resistant not to deform or break apart under the conditions of the welding process.

We claim:

1. A water-soluble insert for use in joining pipes, said water-soluble insert made of a material comprising:
   a salt selected from the group consisting of KCl, NaCl, and mixtures thereof; and, MgO;
   wherein the amount of MgO is between 2.5 and 3.5 times by weight of that of impurities in said salt.

2. The water-soluble insert according to claim 1, wherein said MgO comprises particles of diameters between 2 and 4 microns.

3. The water-soluble insert according to claim 1, wherein said material is characterized by a composition selected from the group consisting of:
   said salt is KCl in the form of particles with an average size of about 0.5 mm;
   said salt is KCl and said material is characterized by a weight ratio KCl:MgO of between 96.5:3.5 and 97.5:2.5 inclusive; and,
   said salt is NaCl and said material comprises 0.2% by weight $MgCl_2$, 0.7% MgO, and the remainder NaCl.

4. The water-soluble insert according to claim 1, wherein said material comprises a solubility enhancer.

5. The water-soluble insert according to claim 4, wherein said solubility enhancer is selected from the group consisting of:
   a mixture of $NaHCO_3$ and citric acid; and,
   a mixture of $Na_2CO_3$ and citric acid.

6. The water-soluble insert according to claim 1, wherein said water-soluble insert is in a form selected from the group consisting of:
   a tube; and,
   a solid cylinder.

7. A method of manufacturing a water-soluble insert for use in joining pipes, comprising:
   mixing a salt selected from the group consisting of KCl, NaCl, and mixtures thereof with MgO;
   adding water in a quantity sufficient such that reaction between said MgO and impurities in said salt can take place;
   drying a product of said step of adding water; and,
   casting a product of said step of drying, thereby forming said water-soluble insert;
   wherein said step of mixing a salt selected from the group consisting of KCl, NaCl, and mixtures thereof with MgO comprises mixing said salt with an amount of MgO that is between 2.5 and 3.5 times by weight of that of impurities in said salt.

8. The method according to claim 7, wherein said step of mixing comprises at least one step selected from the group consisting of:
   mixing commercial-grade KCl with MgO in a KCl:MgO ratio of between 96.5:3.5 and 97.5:2.5 by weight;
   mixing NaCl, $MgCl_2$, and MgO in a weight ratio of 99.1:0.2:0.7; and,
   mixing until a homogeneous mixture is obtained.

9. The method according to claim 7, wherein said step of adding water comprises adding ≤2% water by weight to the product of said step of mixing.

10. The method according to claim 7, wherein said step of drying comprises at least one step selected from the group consisting of:
    drying at a temperature not exceeding 120° C.;
    drying in a drying oven; and,
    drying in a rotating drum oven.

11. The method according to claim 7, additionally comprising:
    breaking up a mass obtained after said step of drying; and,
    sieving through a 1 mm sieve.

12. The method according to claim 7, comprising adding a solubility enhancer prior to said step of casting.

13. The method according to claim 7, wherein said step of casting comprises:
    placing the product of said step of drying in a form; and,
    applying pressure to said form until a water-soluble insert is formed.

14. The method according to claim 7, wherein said step of casting comprises casting a product of said step of drying into a shape selected from the group consisting of:
    a tube; and,
    a cylinder.

15. A method of joining opposed ends of two pipes, comprising:
   inserting into said opposed ends of said pipes an insert according to claim 1; and,
   joining said two pipes, thereby producing a joined pipe.

16. The method according to claim 15, additionally comprising flowing water through said joined pipe until said insert has dissolved.

17. The method according to claim 15, wherein said step of joining comprises butt-welding said two pipes.

18. The method according to claim 15, wherein said two pipes are made of a thermoplastic material.

* * * * *